Dec. 9, 1969   H. MÜLLER ET AL   3,482,774
SENSING ARRANGEMENT FOR A COUNTER
Filed June 24, 1968   2 Sheets-Sheet 2

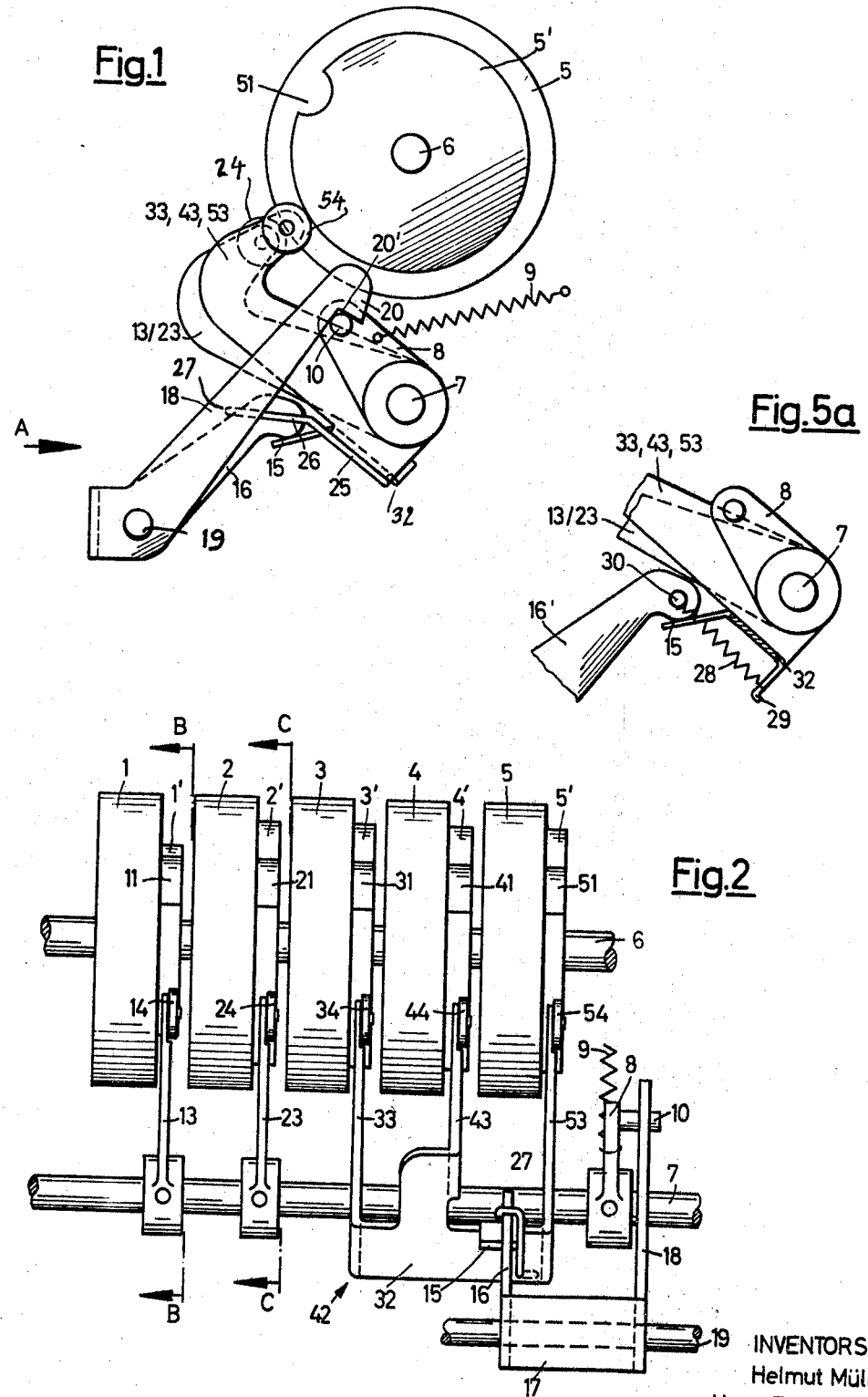

INVENTORS
Helmut Müller
Hans Zimmermann
By: Michael S. Striker
A Horn

United States Patent Office 3,482,774
Patented Dec. 9, 1969

3,482,774
SENSING ARRANGEMENT FOR A COUNTER
Helmuth Müller, St. Georgen, and Hans Zimmermann, Schwenningen, Germany, assignors to Kienzle Apparate G.m.b.H. Villingen, Black Forest, Germany
Filed June 24, 1968, Ser. No. 740,828
Claims priority, application Germany, June 23, 1967, 1,574,004
Int. Cl. G06f 15/18
U.S. Cl. 235—132      10 Claims

ABSTRACT OF THE DISCLOSURE

A counter has an ordinal set of cams sensed by cam follower means. The counter runs from a preset position towards the zero position in which the cam follower means of the lowest order performs a function. A transmission connects the cam follower means of the higher orders with the cam follower means of the lower orders in such a manner that the cam follower means of the lowest order are biassed by a greater sensing force than the cam follower means of the higher orders so that a load can be overcome by the cam follower means of the lowest order, while the accuracy of the counter is not impaired by the sensing pressure of the cam follower means of the higher orders.

BACKGROUND OF THE INVENTION

A sensing arrangement for a counter is known in which a common shaft supports a set of cam follower means respectively cooperating with cams secured to the ordinal counter wheels of a counter. Each cam has a recess, and when the counter rotates from a preset position toward the zero position, the cam follower means sense the recesses, starting with the highest order, and when a cam follower means engages the recess of the cam of the lowest order, the common shaft of all cam follower means performs an angular movement which is used for performing an operation, for example the actuation of a switch or the closing of a valve. The spring biassing the cam follower means must be sufficiently strong to actuate the respective device and consequently the cam follower means engage the cams with a great force which has to be overcome by the turning wheels of the counter so that the accuracy of the counting operation is frequently impaired. Particularly, when the counter wheels of the highest order are shifted by the tens transfer means, high torque peaks occur which are detrimental for the counter.

SUMMARY OF THE INVENTION

It is one object of the invention to overcome this disadvantage of the known sensing arrangements for counters, and to provide a sensing arrangement in which the pressure of the cam follower means on the cams of the higher orders of the counter is reduced.

Another object of the invention is to reduce the sensing pressure of the cam followers of the higher orders, without reducing the actuation force required of the cam follower of the lowest order.

Another object of the invention is to bias the cam followers of the higher orders toward the respective cams while the cam follower of at least the lowest order is held spaced from each cam, until all higher orders of the counter have assumed the zero position.

With these objects in view, the present invention relates to a sensing arrangement for a counter which is particularly advantageously applied when the counter is first preset to indicate a certain amount of a commodity, such as a fluid or electric current, whereupon during the use of the commodity, the counter moves back towards a zero position which is successively obtained by the counter wheels starting with the highest and ending with the lowest order.

An embodiment of the invention comprises a counter; cams connected with the counter wheels, first feeler means including a first cam follower cooperating with the cam of the lowest order of the counter; second feeler means including one or a plurality of second cam follower means cooperating with the cams of the higher orders of the counter; spring means connected with the first feeler means for biassing the first cam follower means toward the respective cam; and transmission means connecting the first and second feeler means and having such a ratio that the second cam follower means are biassed by the spring means with a smaller force than the first sensing means.

Each cam has a control cam portion, for example a recess, and the recesses register in the zero position of the counter. When the counter runs toward the zero position, the higher order counter wheels successively assume the same so that the second cam follower means successively move into the recesses. When all second cam follower means are in this position, the first cam follower means sense the cam of the lowest order and finally move into the recess of the same, and this motion of the first cam follower means and of the first feeler means is used for opening a valve or actuating a switch against the action of a spring.

Since the transmission ratio reduces the force and torques transmitted from the first feeler means to the second feeler means, the sensing force of the second cam follower means is smaller than the sensing force of the first cam follower means, and the greater sensing force of the first cam follower means is used for operating the switch or valve, while the smaller sensing force of the second cam follower means reduces the wear of the counter, and does not impair the accuracy of the counter.

In the preferred embodiment of the invention, the first feeler means includes a shaft and first cam follower arms on the same. The second feeler means includes a carrier mounted on the shaft for turning movement and having second cam follower arms cooperating with the higher orders.

The cam of the lowest order may have another cam portion which causes stepwise operation of the controlled device, and it is also possible to use the two lowest orders for operating the respective device in three or more steps, which can be obtained by suitably shaping the cams of only the lowest order, or of the lowest order and of the next highest order.

The transmission means preferably include a detent lever cooperating with an arm on the shaft of the first feeler means and being connected to the cam follower carrier of the second feeler means. The biassing spring for the cam followers is preferably secured to an arm of the shaft of the first feeler means.

Preferably, the detent lever means are constructed so that the cam follower of the lowest order does not engage the respective cam until all second cam followers have entered the recesses in the cams of the higher orders, so that the cam and counter wheel of the lowest order, or of the two lowest orders, are not unnecessarily subjected to a sensing force.

The novel features which are considered as characteristic for the invention are set forth in particular in the appended claims. The invention itself, however, both as to its construction and its method of operation, together with additional objects and advantages thereof, will be best undestood from the following description of specific embodiments when read in connection with the accompanying drawing.

BRIEF DESCRIPTION OF THE DRAWING

FIG. 1 is a side elevation of one embodiment of the invention;

FIG. 2 is a view of the embodiment of FIG. 1 taken in the direction of the arrow A in FIG. 1;

FIG. 5a is a fragmentary side elevation corresponding to the elevation of FIG. 1, and illustrating a detail of a modified embodiment.

DESCRIPTION OF THE PREFERRED EMBODIMENTS

Figure 3:
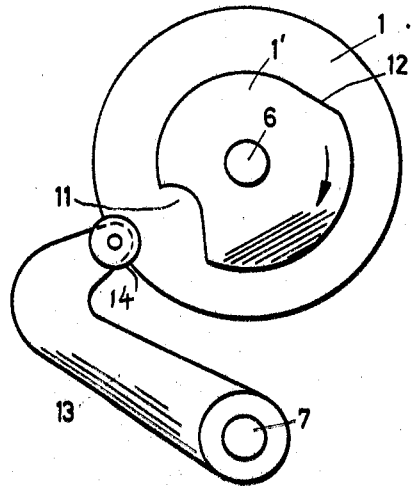
FIG. 3 is a fragmentary sectional view taken on the line B—B in FIG. 2.

Referring first to FIGS. 1 and 2, a counter has five counter wheels 1, 2, 3, 4, 5 which are mounted for rotation on a counter shaft 6. A control cam 1', 2', 3', 4', 5' is respectively secured to each counter wheel. Control cams 3', 4', and 5' are circular and have a cam portion formed as a recess 31, 41 and 51, respectively, recess 51 being best seen in FIG. 1. Cam 1' of the lowest order counter wheel 1, best seen in FIG. 3, has in addition to the recessed control cam portion 11, two circular cam portions having different radii, and a control shoulder 12 connecting the same. Cam 2' of the second lowest order has a recessed control cam portion 21, two circular cam portions having different radii, and a connecting control cam portion 22. When each counter wheel is in the zero position, the recessed control cam portions 11, 21, 31, 41 and 51 are aligned and located opposite cam follower rollers 14, 24, 34, 44, and 54 which are respectively mounted on cam follower arms 13, 23, 33, 43 and 53. The largest radius of cam 2' is equal to the radius of cams 3', 4', and 5', the radius of the other circular portion of cam 2' is smaller and equal to the largest radius of cam 1' whose other cam portion has a smaller radius. However, the recessed control cam portions 11, 21, 31, 41, 51 are the lowest cam portions.

Cam followers 13 and 23 are arms secured to a shaft 7 which has an arm 8 with a stud 10 connected with a spring 9 which biases shaft 7 with cam followers 13 and 23 toward cams 1' and 2'. Disregarding the cam followers 33, 43, 53 of the higher orders, shaft 7 is in a first angular position shown in FIG. 4 while the counter wheel 2 with cam 2' rotates in clockwise direction. Cam follower arm and shaft 7 assume a second angular position when cam follower roller 24 passes over the shoulder 22, and a device, such as a valve, connected to shaft 7 by a linkage will be moved to a first position. When cam follower roller 24 reaches the recessed cam follower portion 21 in the zero position of the second counter wheel 2, shaft 7 is held by cam follower 13, 14 abutting the cam track of greatest radius of cam 1'. Thereupon, cam follower 13 takes over and moves the device to a second position when passing over the shoulder 12 of cam 1' shown in FIG. 3, and when the cam follower 13, 14 of the lowest order engages the recessed control portion 11, cam follower roller 24 also enters the respective recessed control portion 21 of cam 2', and the device is shifted by the angularly displaced cam 7 to an end position.

If it is desired to shift a valve in fewer steps, cam 2' can be constructed as a circular cam with one recessed control portion, as shown for cam 5' in FIG. 1. If only one angular motion of shaft 7 is desired for performing one shifting operation, all cams are constructed as shown for cam 5', and a shifting operation is effected when the cam follower roller 14 of the lowest order falls into the recessed control portion 11 of cam 1'.

However, due to the fact that the spring of the controlled device acts on cam followers 13 and 23, spring 9 must be strong, and the sensing force with which the cam follower rollers engage the cam tracks must be high.

Since the shifting of the device is carried out only in the last order, or in the last two orders, the same high sensing force is not necessary in the higher orders, and if applied in accordance with the prior art, detrimentally influences the accuracy of the counter.

In accordance with the invention, the cam follower arms 33, 43, 53, carrying cam follower rollers 34, 44, 54, are connected by a carrier yoke 32 which is mounted for angular movement on shaft 7.

The first cam follower means 13, 14 and 23, 24 together with shaft 7 and arm 8 thereon, are first sensing means for the two lowest orders of the counter. As explained above, it is sufficient to provide only one first cam follower means 13, 14 cooperating with the lowest order counter wheel 1.

The cam follower means 33, 34, the cam follower means 43, 44, and the cam follower means 53, 54 and the connecting yoke 32 are a second sensing means for sensing the higher orders of counter wheels 3, 4, 5 by cooperation with the respective cams 3', 4', and 5'. While the first sensing means are directly biassed by spring 9 acting on arm 8 of shaft 7, the second sensing means 42 are biassed by the same spring 9 through a transmission.

Arm 8 has a stud 10 engaged by a straight abutment face 20' of a detent portion 20 of a detent lever 18 which is connected by a yoke 17 with a connecting lever 16. Yoke 17 with levers 16 and 18 is mounted on an auxiliary shaft 19 for turning movement. The second feeler means 42 has a projecting rearwardly bent tongue 15 on which the free end of connecting lever 16 rests, as best seen in FIG. 1. A bent spring wire 25 is secured to yoke 32 of the second sensing means 42 and has a hook-shaped portion 27 bent over the edge of connecting lever arm 16.

The force of spring 9 is transmitted by the transmission 20, 18, 16, 15, and 25, 27 to the yoke 32 of the second sensing means 42. This transmission is so constructed that the torque applied by spring 9 to shaft 7 of the first sensing means is greater than the torque applied by spring 9 through the transmission to the second sensing means 42, and consequently the sensing forces $P_3$ of the rollers 34, 44, 54 of the second cam follower means, are smaller than the force $P_4$ applied by the rollers 14 or 24 of the first cam follower means 13, 23 to the cams of the lowest orders.

In a modified construction shown in FIG. 5a, the end of connecting lever 16' carries a pin 30 which is connected by a spring 28 to a projection 29 of yoke 32 so that the free end of connecting lever 16' is pressed against tongue 15 in the same manner as described with reference to FIGS. 1 and 2.

The length and position of detent lever 18 is selected so that stud 10 abutting face 20' blocks turning movement of arm 8 with shaft 7 and cam follower arms 13, 23 under the action of spring 9, in a position in which cam follower rollers 14 and 24 are spaced from the respective cams 1' and 2', while cam follower rollers 34, 44, 54 cooperate with the respective cams, as shown in FIG. 1. Only when all three cam follower rollers 34, 44, 54 fall into the respective recessed control portions 31, 41, 51, sensing contact between cam follower rollers 14 and 24 and the respective cams 1' and 2' is established.

Figure 5:
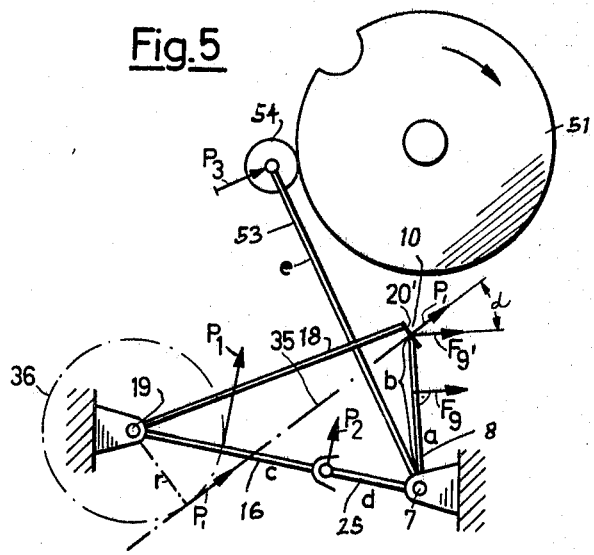
FIG. 5 is a schematic diagram illustrating the forces transmitted between the parts of the apparatus.

Referring now to FIG. 5, the spring force $F_9$ acts on lever arm 8 a distance $a$ from the axis of shaft 7, and a force $F_9'$ is applied by stud 10 to abutment face 20' whose position is so selected that the force $F_9'$ has a component $P_1$ which is tangential to an imaginary circle 36 having a radius $r$ and its center in the axis of the auxiliary shaft 19 on which the transmission element 16, 17, 18 is supported. Force $P_1$ produces a torque in counterclockwise direction as viewed in FIGS. 1 and 5, which acts on detent lever 18 and on connecting lever 16 which transmits a force through spring 25, or spring 28, to the second sensing means 42, turning the same in clockwise direction as viewed in FIGS. 1 and 5 to a sensing position so that cam follower rollers 34, 44, 54 engage the respective cam tracks. As schematically shown in FIG.

5, connecting lever 16 has a length c, and tongue 15 engages lever 16 at a point spaced a radius d from the axis of shaft 7 so that a force $P_2$ is transmitted between connecting lever 16 and tongue 15.

Figure 4:
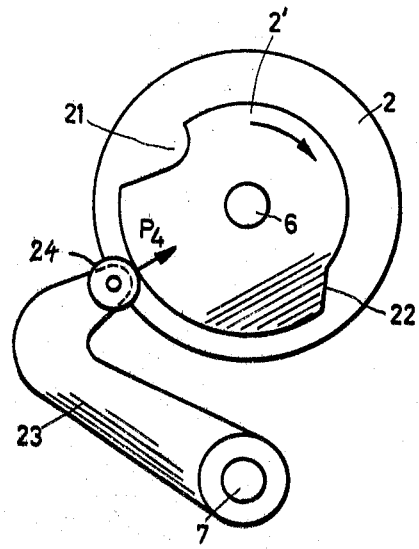
FIG. 4 is a fragmentary sectional view taken on line C—C in FIG. 2.

The force $F_9$ acts at a distance a from the axis of shaft 7 to turn cam follower arm 23 or 13, which also has the length e, so that the cam follower roller 14 or 24 engages the respective cams with a force $P_4$, see FIG. 4.

The force $P_3$ can be calculated as follows:

(1)
$$P_3 = F_9 \cos \alpha \cdot \frac{a}{b} \cdot \frac{r}{c} \cdot \frac{d}{e}$$

wherein $\cos \alpha < 1$, $a < b$, $r < c$, and $d < e$, and wherein the angle $\alpha$ is the angle between the direction of movement of stud 10 and the direction of the abutment face 20'. The force $P_4$ at which cam follower rollers 14 and 24 abut the respective cam tracks can be calculated as follows (2)
$$P_4 = F_9 \cdot \frac{a}{e}$$

It is evident that the transmission elements can be constructed and arranged so that the force $P_4$ is greater than the force $P_3$. Consequently, shaft 7 can exert a great shifting force for overcoming a load when cam follower means 13, 14 falls into recessed control portion 11 of cam 1', while during the running of the counter, the cam follower rollers 34, 44, 54 are pressed with a lesser force against the respective cam tracks so that the counter does not have to overcome great friction forces.

FIGS. 2, 3 and 4 show an embodiment in which the first sensing means include two cam follower means cooperating with the two lowest orders of the counters. It will be understood that in a modified arrangement, only cam follower means 13, 14 may be secured to shaft 7 for sensing cam 1' of the lowest order, while cam follower arm 23 with cam follower roller 24 can be made part of the second feeler means 42 and connected with the yoke 32 instead of with shaft 7.

The apparatus operates as follows:

Assuming that shaft 7 has to turn several angular steps for stepwise closing of a valve controlling the flow of a liquid which during its discharge rotates the counter wheels 1–5 from a previously set position to the zero position, the three cam follower rollers 34, 44, 54 will be in sensing contact with the cams 31, 41, 51 of the higher orders of the counter, the cam follower rollers 14 and 24 will be spaced from the respective cam tracks due to the construction of the transmission between the first and second sensing means, as explained above, and shown in FIG. 1.

As long as any one of the three counter wheels 3, 4, 5 is not in the zero position, the cam follower rollers 34, 44, 54 engage the cam tracks with the force $P_3$. Cam follower rollers 14 and 24 cannot transmit any force to the respective cams since they are blocked by engagement of detent lever 18 with stud 10. When all three counter wheels 3, 4, 5 successively arrive in the zero position, cam follower rollers 34, 44, 54 move into the recesses 31, 41, 51 permitting an angular movement of the second sensing means 42 which places cam follower rollers 34, 44, 54 into sensing contact with cams 3', 4', 5'. The pressure between cam follower rollers 14 and 24 and the cam tracks is $P_3$, and greater than the pressure $P_4$ which prevailed between the cam follower rollers and the cams of the higher orders.

When the cam follower roller 24 passes over shoulder 22, shaft 7 performs an angular step displacing the valve member which is controlled by shaft 7 through a linkage, not shown. When cam follower roller 24 is opposite recess 21, cam follower roller 14 abutting the highest cam portion of cam 1' takes over, and shoulder 12 and recess 11 cause two further angular displacements of shaft 7 and of the controlled valve.

The greater force between cam follower rollers 14 and 24 and cams 1' and 2' is used for shifting the valve member, while the smaller force acting between cam follower rollers 34, 44, 54 and cams 3', 4', 5' is favorable for the counter which has to overcome a lesser friction due to the lesser pressure. It is particularly advantageous that the higher pressure of the lowest orders is not applied as long as the higher orders are sensed.

The resilient connection between connecting lever 16 and tongue 15 on yoke 32 of the second feeler means 42, permits detent lever arm 18 and detent 20 to yield when stud 10 of lever arm 8 is turned in counterclockwise direction to the position of FIG. 1 for tensioning spring 9. Such slight angular displacement of detent lever 18 causes resilient yielding of spring 25 or 28 while a cam follower of the second feeler means 42 abuts the respective cam.

It will be understood that each of the elements described above, or two or more together, may also find a useful application in other types of sensing arrangements for counters differing from the types described above.

While the invention has been illustrated and described as embodied in an arrangement for sensing the position of counter wheels of higher orders with a lesser sensing force than the positions of counter wheels of lower orders, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Sensing arrangement for a counter, comprising, in combination, a counter having an ordinal set of counter wheels; a ordinal set of cams respectively connected with said counter wheels for rotation therewith, each cam having a control cam portion, said control cam portions registering in a predetermined counter position; first feeler means including at least one first cam follower means cooperating with the cam of the lowest order of said counter; second feeler means including a plurality of second cam follower means cooperating the cams of the higher orders of said counter; spring means connected with said first feeer means for biasing said first cam follower means with a first sensing force toward said cam of said lowest order; and transmission means connecting said first and second feeler means and having such a ratio that said second cam follower means are biassed by said spring means to engage said cams of said higher orders with a second sensing force smaller than said first sensing force so that said first sensing force is sufficient to overcome a load on said first feeler means when said first and second cam follower means engage said control cam portions in said predetermined position, while said second smaller sensing force does not impair the accuracy of said counter during movement of said counter wheels toward said predetermined position.

2. Sensing arrangement as claimed in claim 1 wherein said control portion of each cam is a recess; wherein said predetermined position of said counter is the position of said counter in which all said counter wheels indicate zero so that when said counter has run back from a set position to the zero position, all said cam follower means engage the respective recesses and said first feeler means performs a motion for overcoming a load.

3. Sensing arrangement as claimed in claim 1 wherein said first feeler means includes a shaft adapted to be connected to a load; wherein said first cam follower means includes at least one cam follower arm projecting from said shaft and being turnable with the same.

4. Sensing arrangement as claimed in claim 1; wherein said second feeler means includes a carrier mounted on said shaft for turning movement; and wherein said second cam follower means include cam follower arms projecting from said carrier and being turnable with the same.

5. Sensing arrangement as claimed in claim 1 wherein said first feeler means include a shaft supporting said first cam follower means; wherein said cam of said lowest order of said counter has at least one other control cam portion; and wherein said cams of said higher orders are circular and have said control cam portion in the form of a recess whereby when all said second cam follower means engage said recesses of said cams of the higher orders, and said first cam follower means successively engages said control portions of said cam of said lowest order, said shaft performs stepwise motions for overcoming a load.

6. Sensing arrangement as claimed in claim 1 wherein said first feeler means includes two first cam follower means cooperating, respectively, with the cams of the two lowest orders, and a shaft supporting said two first cam follower means; and wherein said cams of said two lowest orders are differently shaped from the cams of the higher orders of said counter for causing successive angular motions of said shaft.

7. Sensing arrangement as claimed in claim 1, wherein said control cam portions are recesses; wherein said second sensing means while said second cam follower means engage the respective cams, hold through said transmission means said first sensing means in a retracted position in which said first cam follower means is spaced from the respective cam until all said second cam follower means engage the respective recesses in the respective cams whereupon said first cam follower means moves into sensing contact with the respective cam.

8. Sensing arrangement as claimed in claim 7, wherein said first feeler means includes a shaft supporting said first cam follower means and connected with said spring means, said shaft having an arm; and wherein said transmission means include a stud on said arm, detent lever means connected with said second sensing means for movement therewith and having a detent portion engaging said stud for holding said arm with said shaft of said first sensing means in said retracted position against the action of said spring means as long as at least one of said second cam follower means does not engage said recess in the respective cam.

9. Sensing arrangement as claimed in claim 8, wherein said transmission means include an auxiliary shaft; wherein said detent lever means is mounted on said auxiliary shaft for turning movement and includes a detent lever arm having said detent portion, and a connecting arm; wherein said second sensing means includes a carrier mounted for turning movement on said shaft of said first sensing means and carrying said second cam follower means; and resilient means connecting said carrier with said connecting arm of said detent lever means.

10. Sensing arrangement as claimed in claim 9 wherein said detent portion has an abutment face engaged by said stud and having such a position that the force exerted by said stud on said detent lever means is tangential to an imaginary circle about the axis of said auxiliary shaft having a radius which is so small that the torque exerted by said detent lever means on said second feeler means under the action of said spring means is less than the torque exerted by said spring means on said shaft of said first sensing means.

References Cited

UNITED STATES PATENTS

| | | | |
|---|---|---|---|
| 2,804,265 | 8/1957 | Wilson et al. | 235—132 X |
| 2,904,251 | 9/1959 | Hazard et al. | 235—132 |
| 3,115,301 | 12/1963 | Renner | 235—132 |

FOREIGN PATENTS

| | | |
|---|---|---|
| 1,291,514 | 3/1962 | France. |
| 651,489 | 10/1937 | Germany. |
| 616,750 | 1/1949 | Great Britain. |

RICHARD B. WILKINSON, Primary Examiner

STANLEY A. WAL, Assistant Examiner